(12) United States Patent
Thompson et al.

(10) Patent No.: US 8,950,974 B2
(45) Date of Patent: Feb. 10, 2015

(54) MAT FOR SEA FLOOR INSTALLATION

(75) Inventors: Wayne Leslie Thompson, Navasota, TX (US); Harry Charles Tate, Richwood, TX (US)

(73) Assignee: Seabed Technologies LLC, Houston, TX (US)

( * ) Notice: Subject to any disclaimer, the term of this patent is extended or adjusted under 35 U.S.C. 154(b) by 120 days.

(21) Appl. No.: 13/587,626

(22) Filed: Aug. 16, 2012

(65) Prior Publication Data
US 2014/0050534 A1 Feb. 20, 2014

(51) Int. Cl.
*E02B 3/14* (2006.01)

(52) U.S. Cl.
USPC .................................. 405/18; 405/19; 405/20

(58) Field of Classification Search
CPC ........... E02B 3/12; E02B 3/122; E02B 3/123; E02B 3/127
USPC .............................. 405/15, 16, 17, 18, 19, 20
See application file for complete search history.

(56) References Cited

U.S. PATENT DOCUMENTS

| | | | | | |
|---|---|---|---|---|---|
| 3,396,542 | A | * | 8/1968 | Lamberton | 405/18 |
| 3,425,228 | A | | 2/1969 | Lamberton | |
| 3,474,626 | A | * | 10/1969 | Colle | 405/18 |
| 3,561,219 | A | * | 2/1971 | Nishizawa et al. | 405/19 |
| 3,565,125 | A | * | 2/1971 | Hayes et al. | 139/384 R |
| 3,837,169 | A | | 9/1974 | Lamberton | |
| 4,184,788 | A | * | 1/1980 | Colle | 405/18 |
| 4,405,257 | A | * | 9/1983 | Nielsen | 405/18 |
| 4,449,847 | A | * | 5/1984 | Scales et al. | 405/18 |
| 4,486,120 | A | | 12/1984 | Landry, Jr. | |
| 4,502,815 | A | * | 3/1985 | Scales et al. | 405/18 |
| 4,592,675 | A | * | 6/1986 | Scales et al. | 405/18 |
| 4,940,364 | A | * | 7/1990 | Dlugosz | 405/19 |
| 5,722,795 | A | | 3/1998 | Angel et al. | |
| 5,944,449 | A | | 8/1999 | Angel et al. | |
| 6,027,285 | A | | 2/2000 | Angel et al. | |
| 6,106,194 | A | | 8/2000 | Angel et al. | |
| 6,139,220 | A | | 10/2000 | Angel et al. | |
| 6,406,217 | B1 | | 6/2002 | Daniel et al. | |
| 6,416,253 | B1 | | 7/2002 | Wimp et al. | |
| 7,029,205 | B2 | * | 4/2006 | Daigle | 405/18 |
| 7,329,336 | B2 | | 2/2008 | Britton | |
| D580,561 | S | | 11/2008 | Salerno | |
| 2010/0104379 | A1 | | 4/2010 | Amuchastegui et al. | |

FOREIGN PATENT DOCUMENTS

| | | | | |
|---|---|---|---|---|
| EP | 0001161 | A1 | 2/1979 | |
| EP | 0370889 | * | 5/1990 | ............... E02B 3/12 |
| GB | 1162827 | * | 8/1969 | ............... E02B 3/12 |
| WO | WO8805842 | | 8/1988 | |
| WO | WO2011144902 | A2 | 11/2011 | |

OTHER PUBLICATIONS

ARMORFORM Your Solution to Permanent Hard Armor Erosion Control, ARMORFORM Incorporated, 2002 Brochure—8 sheets.

* cited by examiner

*Primary Examiner* — Frederick L Lagman
(74) *Attorney, Agent, or Firm* — Cantor Colburn LLP

(57) ABSTRACT

In one aspect, a mat for placement on a sea floor includes a plurality of fabric cells formed from a first fabric layer and a second fabric layer, each of the plurality of fabric cells including a first cell edge and a second cell edge where the first and second fabric layer are coupled, the first and second cell edges being aligned in a first direction, a third cell edge and a fourth cell edge where the first and second fabric layer are coupled, the third and fourth cell edges being aligned in a second direction and a cavity configured to receive a filling material, the cavity being defined by the first, second, third and fourth cell edges. The mat also includes a grid of cables disposed within and supporting the plurality of fabric cells.

18 Claims, 3 Drawing Sheets

MAT FOR SEA FLOOR INSTALLATION

BACKGROUND OF THE DISCLOSURE

1. Field of the Disclosure

The disclosure relates generally to apparatus and methods for providing a mat for installation on a sea floor.

2. Description of the Related Art

Mats may be used for marine applications where separation, stabilization, protection and scour prevention is needed for pipelines and other sea floor installations are submerged in water. The mats provide resistance to hydrodynamic forces caused by currents along a sea floor, where the forces can move and/or damage the installed objects. In an example, a pipeline disposed on the sea floor is covered with a mat to stabilize the pipeline beneath the weight of the mat to resist sea floor currents.

The mats may be formed from cement blocks poured in molds at a manufacturing site. In some cases, the size of the mats is limited due to weight and difficulty moving mats prior to installation on a sea floor. For example, concrete mats may be poured and cured in molds at a manufacturing site, removed from the molds and shipped to a dockside location where a vessel having a crane transports the mats to an installation site. Transportation of the mats from the manufacturing site to the dockside location can be costly due to the weight and size of the mats. The size and weight may also be limited by moving and lifting mechanisms capability to maneuver these objects. Further, a limited choice of options for land transportation may also limit the mat size.

In addition, the vessel used to deploy the mat to the marine installation site is a large cost during installation, where extra time spent at sea can lead to significant expenditures. For example, a vessel may be limited to installing a single mat at a time, due to the finished mat size and/or weight, which can lead to increased installation costs for larger sea floor areas that are to be covered with mats.

SUMMARY

In one aspect, a mat for placement on a sea floor includes a plurality of fabric cells formed from a first fabric layer and a second fabric layer, each of the plurality of fabric cells including a first cell edge and a second cell edge where the first and second fabric layer are coupled, the first and second cell edges being aligned in a first direction, a third cell edge and a fourth cell edge where the first and second fabric layer are coupled, the third and fourth cell edges being aligned in a second direction and a cavity configured to receive a filling material, the cavity being defined by the first, second, third and fourth cell edges. The mat also includes a grid of cables disposed within and supporting the plurality of fabric cells, wherein the plurality of fabric cells exhibit substantially similar articulation in the first and second directions after the plurality of fabric cells are filled with the filling material.

In another aspect, a method of providing a mat for placement on a sea floor includes forming a plurality of fabric cells from a first fabric layer and a second fabric layer, each of the plurality of fabric cells including a first cell edge and a second cell edge where the first and second fabric layer are coupled, the first and second cell edges being aligned in a first direction, a third cell edge and a fourth cell edge where the first and second fabric layer are coupled, the third and fourth cell edges being aligned in a second direction and a cavity configured to receive a filling material defined by the first, second, third and fourth cell edges. The method also includes disposing a grid of cables within the plurality of fabric cells, wherein the plurality of fabric cells exhibits substantially similar articulation in the first and second directions after the plurality of fabric cells are filled with the filling material.

BRIEF DESCRIPTION OF THE DRAWINGS

The disclosure herein is best understood with reference to the accompanying figures in which like numerals have generally been assigned to like elements and in which.

DETAILED DESCRIPTION

Figure 1:
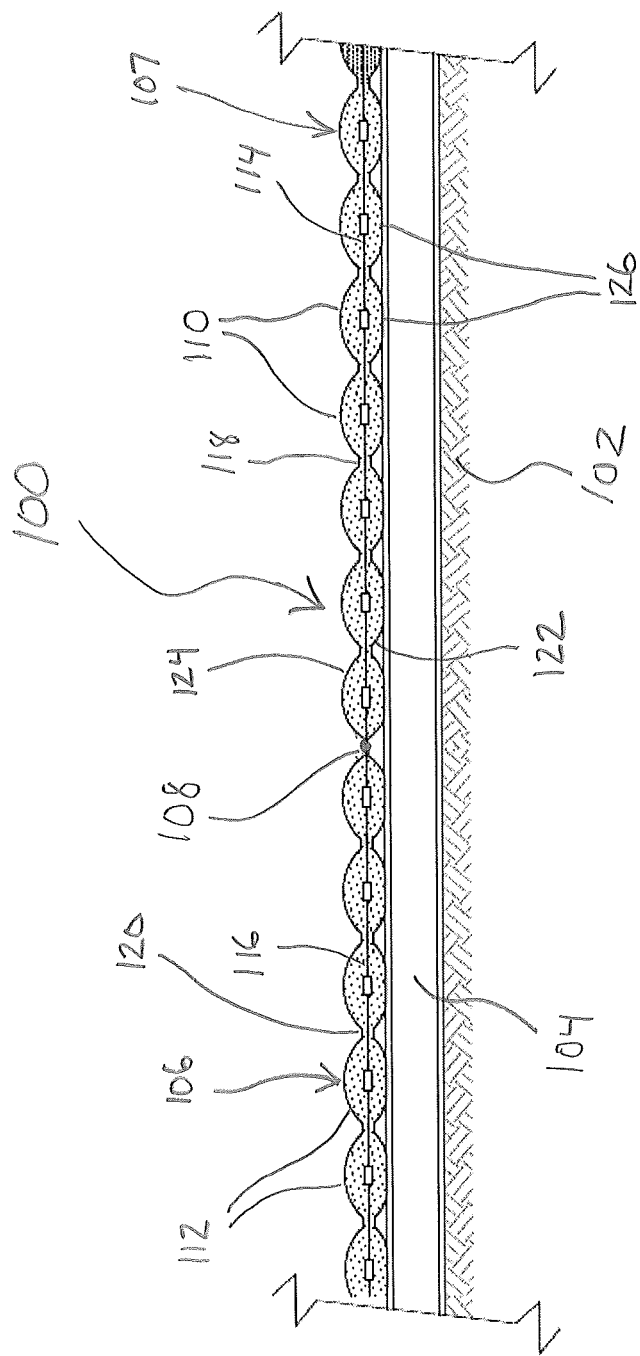
FIG. 1 is a side view of an exemplary mat disposed on a sea floor to secure a pipeline.

FIG. 1 is a side sectional view of a portion of an exemplary mat 100 disposed on a sea floor 102. The mat 100 is positioned over a pipeline 104 and is configured to secure or prevent movement of the pipeline 104 along the sea floor due to currents and other hydrodynamic forces. In an embodiment, the mat 100 is formed by connecting a first mat section 106 and a second mat section 107 via a connector mechanism, such as connectors 108. The mat 100 includes a plurality of fabric cells 110 and 112 making up first mat section 106 and second mat section 107, respectively. The cells 110 and 112 are formed from a first fabric layer 122 and a second fabric layer 124, where the layers are joined together by a suitable method, such as stitching or adhesives. In an embodiment, the fabric layers are woven from non-abrasive fabric, such as nylon, nylon/polyester blends, Kevlar™, cotton blends or wool. Cable grids 114 and 116 are disposed within the fabric cells 110 and 112, respectively, and thus support the mat 100 when the fabric cells are filled with a filling material. As depicted, the cable grids 114 and 116 are disposed in between the fabric layers where cables are located in ports 118 and 120, respectively. In addition, the ports 118 and 120 are configured provide fluid communication between adjacent fabric cells. In an embodiment, ports 118 and 120 may be positioned substantially at the center of each edge of the fabric cells, where the cells are square or rectangular. Thus, the ports allow passage of any suitable filling material, such as a concrete mixture between cavities in the cells to form a mat at a loading or installation site. In addition, an outer surface of the first fabric layer 122 may be coated with a non-abrasive material at a loading site. For example, after the mat 100 is filled with concrete mixture and cured at the loading or installation site, a non-abrasive urethane material may be sprayed on one or both outer surfaces of the mat 100 to further protect the pipeline 104 as the mat is placed on the object.

In an embodiment, the mat 100 is disposed over a pipeline or an intersection of pipelines to prevent movement of the pipelines due to current forces. The depicted mat 100 may be assembled in part at manufacturing site, where the first and second fabric layers 122, 124 are joined together to form the fabric cells 110, 112. The fabric layers 122, 124 may be joined around the cable grids 114, 116 at the manufacturing site, thereby providing support for the plurality of fabric cells after the cells are filled. The plurality of fabric cells 110, 112 may remain empty (i.e., not filled with a liquid or concrete mixture) at the manufacturing site, thus providing improved mobility of the mat 100 for transport to the loading site. The mat 100 may be transported to the loading site, where the empty fabric cells 110, 112 are filled with a concrete mixture and cured, thereby forming the finished mat 100. By filling the mat 100 with a concrete mixture after transporting the mat 100 to the loading site, shipping costs are reduced and mat mobility is improved. In an embodiment, the loading site is a dock where a vessel receives the cured concrete mat 100 and transports the mat to the installation site, such as an underwater pipeline location. The vessel and/or loading site may include a crane apparatus that attaches to the finished mat 100 to place the mat on the vessel after the concrete is cured. Further, a crane apparatus on the vessel may also lift the mat 100 into the water once the vessel has reached the installation site.

The mat 100 includes the connectors 108 integral to the cable grids 114, 116, where the connectors 108 are used to connect mat sections together and may be used to support the mat as it is lifted during transport, placement and installation. In embodiments, the connectors 108 and cable grids 114, 116 are sufficiently strong and durable to completely support the cured concrete mat 100 as it is lifted from one side via the connectors 108. In an embodiment, the cable grids 114, 116 are formed from a high strength galvanized steel cable or wire, polypropylene synthetic fiber cable or a combination thereof. The connectors 108 may include any suitable connector, such as a steel bracket or eye. In an embodiment, the connectors 108 are open and/or closed steel spelter sockets integrated into the cable grids. The modularity provided by coupling mat sections together via connectors 108 enables flexibility for quickly providing mats of varying sizes for different applications using common "building block" mat sections coupled by connectors 108 to provide a desired mat size for an application. The mat 100 does not require forms or molds to provide the cured concrete cells or blocks, as the fabric cells 110, 112 are filled with the concrete mix to provide the finished mat. Thus, mat manufacturing is simplified due to the lack of forms needed for production.

Figure 2:
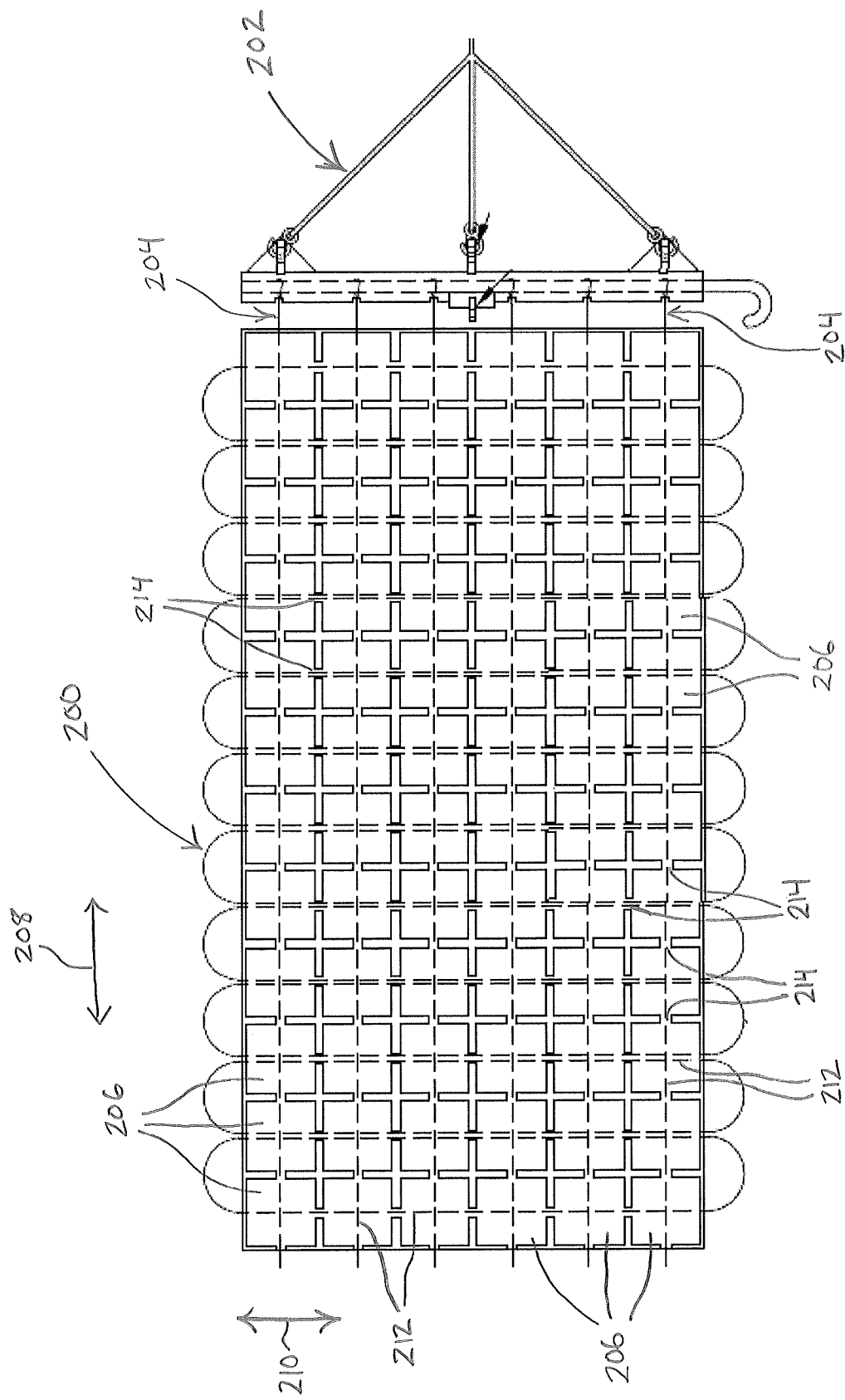
FIG. 2 is a top view of an exemplary mat with one side of the mat coupled to a lifting mechanism.

FIG. 2 is a top view of an exemplary mat 200 coupled to a portion of a lifting mechanism 202 according to an embodiment. The mat 200 is coupled to the lifting mechanism 202 at a first side 204 of the mat 200 where connectors 204 completely support the mat 200. The lifting mechanism 202 may include a crane used to move the mat 200 after fabric cells 206 in the mat 200 are filled with a concrete mix and cured. As depicted, the fabric cells 206 are substantially symmetrically arranged in a first direction 208 and a second direction 210, where the first and second directions are substantially perpendicular. The symmetrical arrangement provides substantially similar mat articulation in the first and second directions 208 and 210. In an embodiment, the pattern of the fabric cells 206 is substantially the same in the first direction 208 and the second direction 210 due to the substantially square cell shape and checked arrangement. A cable grid 212 is shown embedded in the mat 200 between two fabric layers, where the connectors 204 are integrated into the cable grid 212 to completely support the finished mat 200 from one side of the mat during lifting. Ports 214 provide fluid communication between adjacent fabric cells 206 and also receive the cable grid 212 that supports the mat 200.

Figure 3:
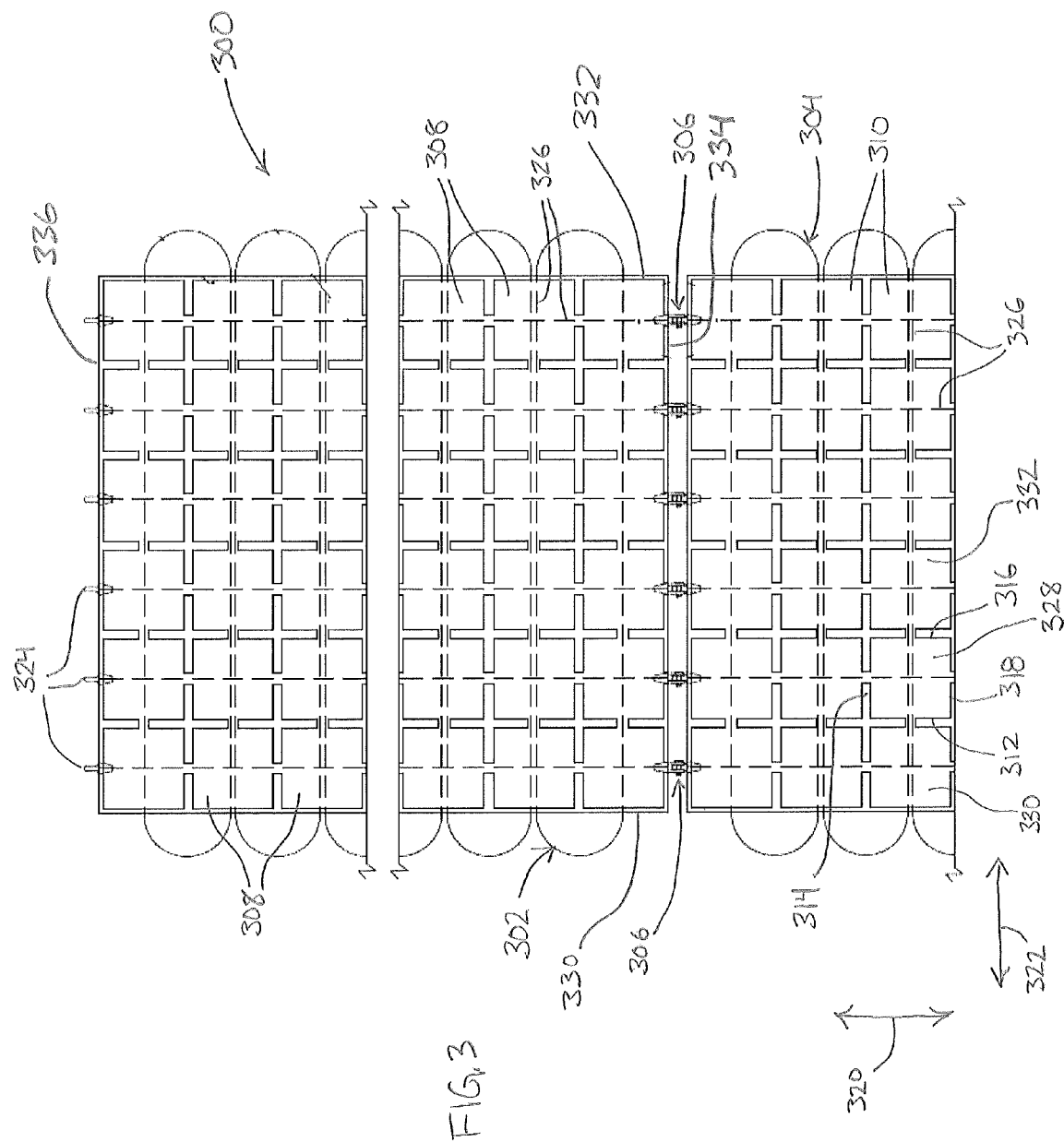
FIG. 3 is a top view of an exemplary mat formed by coupling two mats together via connectors.

FIG. 3 is a top view of an embodiment of a mat 300. The mat 300 is formed by joining a first mat section 302 to a second mat section 304 by connectors 306. The connectors 306 provide connection points for adjacent sides of the mat sections, thereby providing flexibility when providing various mat sizes for particular applications. In addition, connectors, including connectors 306 and connectors 324, may also be coupled to a lifting mechanism to support the mat 300 during mat movement. The connectors 306, 324 are integrated into cable grids 326 and are thus able to completely support the entire mat 300 when lifted from connectors extending from a side of the mat. In an embodiment, substantially square fabric cells 310 are formed from a pair of fabric layers. In other embodiments, the fabric cells 310 are formed in other shapes to provide a desired articulation, such as rectangular or polygonal shapes. As depicted, the fabric cells 310 have a first cell edge 312 and a second cell edge 316 being substantially parallel and aligned in a first direction 320. Further, the fabric cells 310 have a third cell edge 314 and fourth cell edge 318 that are substantially parallel and aligned in a second direction 322, where the first direction 320 is substantially perpendicular to the second direction 322. The fabric cells 310 configuration provides articulation of the cells and the mat during transport and installation. For example, the first cell edge 312 and second cell edge 316 are axes that enable movement of fabric cell 328 relative to fabric cells 330 and 332, where the cells move relative to one another along an articulation axis at the cell edges 312, 316. Similarly, third cell edge 314 and fourth cell edge 318 each provide axes of articulation of adjacent fabric cells on either side of the fabric cell 328 in the first direction 320. The articulation of fabric cells along first direction 320 and second direction 322 allow the cured concrete mat to articulate substantially similarly in each direction. For example, a 20 foot by 20 foot mat may be lifted on first and second sides that are parallel and opposite one another, such as sides 330 and 332, to cause the mat to articulate into a U-shape when viewed from the side. Further, the mat may also be lifted by third and fourth sides that are parallel and opposite one another, such as sides 334 and 336, to cause the mat to articulate into a substantially similar U-shape when viewed from the side. This flexibility in articulation may provide improved flexibility during installation over objects on the sea floor as well as improved mobility during transport.

While the foregoing disclosure is directed to certain embodiments, various changes and modifications to such embodiments will be apparent to those skilled in the art. It is intended that all changes and modifications that are within the scope and spirit of the appended claims be embraced by the disclosure herein.

The invention claimed is:

1. A mat for placement on a sea floor, the mat comprising:
a plurality of fabric cells formed from a first fabric layer and a second fabric layer, each of the plurality of fabric cells comprising:
a first cell edge and a second cell edge where the first and second fabric layer are coupled, the first and second cell edges being aligned in a first direction,
a third cell edge and a fourth cell edge where the first and second fabric layer are coupled, the third and fourth cell edges being aligned in a second direction,
a cavity configured to receive a filling material, the cavity being defined by the first, second, third and fourth cell edges, wherein each of the first, second, third and fourth cell edges comprise ports for concrete distribution; and
a grid of cables disposed within and supporting the plurality of fabric cells, wherein the plurality of fabric cells exhibit substantially similar articulation in the first and second directions after the plurality of fabric cells are filled with the filling material and the grid of cables is disposed in the ports.

2. The mat of claim 1, further comprising connectors integral to the grid of cables are disposed on a first side of the mat, wherein the connectors are configured to couple a second mat to the first side of the mat.

3. The mat of claim 2, wherein the connectors enable the mat to be completely supported by a connection to the first side of the mat after the plurality of fabric cells are filled with the concrete mixture.

4. The mat of claim 1, wherein the filling material comprises a concrete mixture.

5. The mat of claim 1, wherein the plurality of fabric cells are symmetrically arranged in the first and second direction, wherein the first direction is substantially perpendicular to the second direction.

6. The mat of claim 1, wherein the first fabric layer and second fabric layer are each made from a non-abrasive fabric.

7. The mat of claim 6, wherein an outer surface of the first fabric layer is coated with a non-abrasive urethane material.

8. A method of providing a mat for placement on a sea floor, the method comprising:
  forming a plurality of fabric cells from a first fabric layer and a second fabric layer, each of the plurality of fabric cells comprising:
    a first cell edge and a second cell edge where the first and second fabric layer are coupled, the first and second cell edges being aligned in a first direction,
    a third cell edge and a fourth cell edge where the first and second fabric layer are coupled, the third and fourth cell edges being aligned in a second direction,
    a cavity configured to receive a filling material defined by the first, second, third and fourth cell edges, wherein each of the first, second, third and fourth cell edges comprise ports for filling material distribution, and
  disposing a grid of cables within the plurality of fabric cells, wherein the plurality of fabric cells exhibits substantially similar articulation in the first and second directions after the plurality of fabric cells are filled with the filling material and the grid of cables is disposed in the ports.

9. The method of claim 8, wherein disposing the grid of cables comprises disposing connectors integral to the grid of cables on a first side of the mat wherein the connectors are configured to couple a second mat to the first side of the mat.

10. The method of claim 9, wherein disposing connectors integral to the grid of cables comprises completely supporting the mat by a connection to the first side of the mat after the plurality of fabric cells are filled with the filling material.

11. The method of claim 8, comprising filling the fabric cells with a concrete mixture.

12. The method of claim 8, wherein forming the plurality of fabric cells comprises forming and arranging the plurality of fabric cells symmetrically in the first and second directions, wherein the first direction is substantially perpendicular to the second direction.

13. The method of claim 8, forming the plurality of fabric cells from the first fabric layer and the second fabric layer comprises forming the plurality of fabric cells from a first fabric layer woven from a non-abrasive fabric and a second fabric layer woven from a non-abrasive fabric.

14. The method of claim 13, comprising coating an outer surface of the first fabric layer with a non-abrasive urethane material.

15. A mat for placement on a sea floor, the mat comprising:
  a plurality of fabric cells formed from a first fabric layer and a second fabric layer, each of the plurality of fabric cells comprising:
    a first cell edge and a second cell edge where the first and second fabric layer are coupled, the first and second cell edges being aligned in a first direction,
    a third cell edge and a fourth cell edge where the first and second fabric layer are coupled, the third and fourth cell edges being aligned in a second direction substantially perpendicular to the first direction,
    a cavity configured to receive a concrete mixture defined by the first, second, third and fourth cell edges, wherein each of the first, second, third and fourth cell edges comprise ports for filling material distribution; and
  a grid of cables disposed within the plurality of fabric cells, wherein connectors integral to the grid of cables are disposed on a first side of the mat and enable the mat to be completely supported by a connection to the first side of the mat after the plurality of fabric cells are filled with the concrete mixture and the grid of cables is disposed in the ports.

16. The mat of claim 15, wherein the connectors provide connection points to couple a second mat to the first side of the mat.

17. The mat of claim 15, wherein the plurality of fabric cells are symmetrically arranged in the first and second direction.

18. The mat of claim 15, wherein the plurality of fabric cells exhibits substantially similar articulation in the first and second directions after the plurality of fabric cells are filled with the concrete mixture.

\* \* \* \* \*